United States Patent [19]

Hoyt et al.

[11] Patent Number: 4,925,124
[45] Date of Patent: May 15, 1990

[54] DUAL-MODE INERTIA REEL SYSTEM

[75] Inventors: Steven W. Hoyt, Garden Grove; Sidney S. Thomas, Huntington Beach, both of Calif.

[73] Assignee: Pacific Scientific Company, Anaheim, Calif.

[21] Appl. No.: 175,059

[22] Filed: Mar. 30, 1988

Related U.S. Application Data

[63] Continuation-in-part of Ser. No. 34,408, Apr. 3, 1987, abandoned.

[51] Int. Cl.⁵ .................. B60R 22/38; B60R 22/40
[52] U.S. Cl. .................. 242/107.4 A; 242/107.4 B
[58] Field of Search .............. 242/122 B, 107.4 A, 242/107.4 B, 107.3, 84.52 C; 188/135, 139, 134, 72.2, 72.7; 192/93 A, 48.91, 54, 70, 103 A, 103 C, 105 B

[56] References Cited

U.S. PATENT DOCUMENTS

| | | |
|---|---|---|
| 2,245,987 | 6/1941 | Lambert . |
| 2,827,994 | 3/1958 | Tiedeman et al. . |
| 3,100,609 | 8/1963 | Wrighton . |
| 3,240,510 | 3/1966 | Spouge . |
| 3,435,920 | 4/1969 | Klaue . |
| 4,109,881 | 8/1978 | Fohl . |
| 4,118,996 | 10/1978 | Eichinger .............. 192/48.91 X |
| 4,515,326 | 5/1985 | Karlsson . |
| 4,589,296 | 5/1986 | Sato et al. . |

FOREIGN PATENT DOCUMENTS

| | | |
|---|---|---|
| 240325 | 10/1959 | Australia . |
| 1029156 | 6/1964 | France . |
| 209732 | 1/1967 | France . |

*Primary Examiner*—John M. Jillions
*Attorney, Agent, or Firm*—Knobbe, Martens, Olson & Bear

[57] ABSTRACT

An inertia responsive mechanism employs a freely mounted inertia mass in combination with a seat belt retractor mechanism wherein the inertia mass is sensitive to vehicle deceleration or to strap acceleration, or to both. Disclosed are a variety of arrangements for supporting an inertia mass in a manner to permit free movement of the mass including balls and recesses, conical post ends in holes, frusto-conical surfaces on tube ends and frusto-conical surfaces in combination with balls in grooves. Anti-lock mechanisms prevent inertial locking while the strap is retracting. In a compact inertia reel arrangement, a reel ratchet wheel directly supports the inertia mass. Also disclosed are mechanisms for manually resetting inertia reels.

40 Claims, 7 Drawing Sheets

DUAL-MODE INERTIA REEL SYSTEM

RELATED APPLICATION

This is a continuation-in-part application of U.S. Pat. Application No. 034,408 filed Apr. 3, 1987, now abandoned.

FIELD OF THE INVENTION

This invention relates to restraint systems for controlling the movement of a mass subjected to acceleration forces, and particularly to systems for controlling the locking of seat belts and harness restraint systems in vehicles such as aircraft. The invention further relates to inertia responsive mechanisms, and methods of providing actuating forces in response to movement of an inertia mass.

BACKGROUND OF THE INVENTION

Vehicle restraint systems typically employ a reel with a flexible strap or other element wound thereon, a spring for urging the reel into strap retracted position and a mechanism for locking the reel automatically in emergency situations. One well known system utilizes a so-called inertia reel wherein an inertia mass senses acceleration on the strap to lock the reel at a predetermined level. Thus, if the strap is subjected to forces to extend the strap beyond a set acceleration, such as occurs when a person is suddenly thrown forward with respect to a vehicle, the strap acceleration will quickly lock the reel and prevent further extension of the strap. The term "acceleration" as used herein is intended to include "deceleration" as well.

In another known approach, an acceleration sensitive locking mechanism such as a pendulum is attached to the vehicle, and, if the vehicle is subjected to sudden stopping forces, the reel is locked to prevent further strap extension. While this approach is less direct with regard to the person wearing the strap, it has certain advantages over the strap acceleration device. For example, since the restraint harness straps must accelerate to lock the reel, the seat occupant must move out of the fully back, seated position for locking to occur, and there is thus some delay in locking. This may place the person in disadvantageous position for maximum crash protection or for taking some other action. With the use of a vehicle acceleration sensitive inertial locking system, added protection is supplied as the reel is locked during an initial crash pulse. Further, there are dangerous situations when locking is desired even though the strap is not withdrawn.

Since there are also some advantages to strap sensitive devices, it is desirable that a dual-mode system be provided, that is, strap sensitive and vehicle sensitive. There are, however, a number of additional aspects that should be considered for a satisfactory system. A vehicle sensitive mechanism should have the capability to lock a reel based on acceleration forces that can occur from a number of different directions. For example, in helicopter crashes, it is particularly important that a vehicle sensitive system function in situations in addition to crashes occurring while the vehicle is moving forward. Many prior vehicle sensitive systems have only one directional capability.

It is also highly desirable that any dual-mode system be integrated such that both the vehicle and the strap sensitive systems are provided within a single reel package. This is desirable for any application, but is particularly critical for military aircraft requirements wherein space and weight must receive premium consideration.

Some dual-mode systems are shown in earlier patents. U.S. Pat. No. 3,240,510 shows in FIGS. 26 and 27 a gimbal mounted pendulum carrying teeth forming a pawl or sear that cooperate with ratchet teeth of a reel to prevent rotation of the reel. Inertia forces acting on the pendulum weight in multiple directions are intended to produce reel locking action.

U.S. Pat. No. 4,515,326 to Karlsson discloses a horizontally oriented inertia disc which is driven by a member mounted on a vertical shaft which rotates through gearing in response to rotation of a reel. The interconnection between the inertia disc and the driving member is a plurality of balls positioned in mating recesses formed in the inertia disc and the driving member. Inertia forces acting on the inertia disc in any direction except toward the driving member will cause the inertia disc to move, against gravity, axially away from the driving member, and this axial movement is utilized to pivot a pawl so as to apply braking or locking action on the reel.

U.S. Pat. No. 4,109,881 discloses in FIGS. 26 and 27 a strap-sensitive inertia disc for triggering locking of a reel wherein an inertia ball positioned in a recess adjacent the periphery of the disc will wedge against the disc to produce locking action, when the ball is subjected to acceleration force as a result of forces applied to the vehicle.

Another known dual-mode system recently developed applies a pendulum for the vehicle sensitive inertia member together with a buckling spring column as a trip mechanism.

Another requirement for many military applications is that, once locked, the reel should remain locked until manually reset. Automatic unlocking could cause a "ratcheting out" effect in multiple pulse crash situations, therby allowing the torso to be in a disadvantageous position to withstand further shock pulses. Thus, a manual reset control must also be integrated into the system in a convenient, practical and reliable manner. Related to this, the inertia sensitive mechanisms used in combat aircraft must be designed so as to prevent inadvertent locking in flight. A pilot in combat does not need the distraction of having to recycle a manual control handle during a critical maneuver. The manual control should also permit manual locking as well as unlocking.

In spite of the foregoing known systems, a need exists for an improved dual-mode inertia reel restraint system that provides omni-directional vehicle acceleration sensitivity, as well as strap acceleration sensitivity in an integrated package, with a manual operational capability as well.

SUMMARY OF THE INVENTION

In one form of the invention, there is provided an inertia responsive mechanism including an inertia mass, preferably having a disc shape with a plurality of recesses formed on the opposite sides or faces of the mass. A member on each side of the mass is similarly formed with a plurality of recesses, each respectively aligned with an adjacent recess on the mass. A ball is positioned in each of the mating recesses which spaces the disc from the adjacent members. One of the members is preferably fixed, while the other is movable toward and away from the fixed member, but is restrained from moving transversely with respect to the fixed member. A spring or other suitable means urges the movable member toward the fixed member, thus centering the balls within the mating recesses with the inertia mass supported on the balls between the two members. The displacement of the movable member is utilized to trigger or actuate another event.

Another somewhat simpler and less expensive alternative for supporting and driving the inertia mass includes a plurality of spaced posts extending through the inertia mass and having conical tips on the ends of the posts which slide in cooperation with holes in the adjacent members.

In another arrangement, the inertia mass has a centrally located tube having its axial ends tapered and cooperating with a similarly formed tube on each of the adjacent members. Transverse movement of the inertia mass in response to vehicle acceleration forces will cause the driven member to be displaced.

In the arrangements illustrated herein, the mechanism is utilized in a vehicle restraint system responsive to vehicle acceleration. Typically, this includes a frame or housing, usually to be mounted to the vehicle, a reel rotatably mounted on the frame with a strap or other flexible element wound on the reel, a spring or other such means urging the reel to rotate in a direction to retract the strap, and a lock to prevent unwinding rotation of the reel in an emergency situation. Preferably, this includes a control to render the lock ineffective during normal operations of the restraint system with the inertia responsive mechanism allowing the lock to function in an emergency.

If the vehicle and the reel housing which is fixed relative to the vehicle are subjected to a sudden deceleration, the inertia mass will not decelerate at the same rate with the vehicle since it can move somewhat independently of the vehicle. Acceleration of the inertia mass relative to the adjacent members will axially displace the movable member against a flange on the end of a hub, thus causing the hub to move axially. This in turn, in one form of the invention, causes a cam on the other end of the hub to be moved out from under a latch dog which is spring-biased to engage a reel-mounted ratchet wheel, and thereby lock the wheel.

In one form of the invention, dual-mode capability is provided by a second inertia mass which is rotated with the reel by yieldable means which senses strap acceleration. Axial movement of a movable member cooperating with the second inertia mass is utilized to displace the above-referenced cam to thereby lock the reel.

Preferably, however, the vehicle sensitive inertia mass is rotatably driven by the reel through rotationally yieldable means so that a second inertia mass is not needed, in that the single inertia mass is responsive to both vehicle acceleration and strap acceleration. Thus, with the balls or the pins, the non-axially moving member is mounted to rotate with the reel. In the above-mentioned conical tube end mounting means, the tube ends are, in one arrangement, formed in a spiral or at a slant with respect to the rotational axis so that rotational inertia forces applied to the mass will produce axial displacement of the driven member.

In a still more compact arrangement with a minimum of parts, the inertia driving means is formed directly on the axial end face of the reel end disc which has ratchet teeth on its periphery. That is, the reel ratchet wheel forms the driving member for the inertia mass, and only a driven member is needed to be axially displaced by the inertia mass.

Differing acceleration sensitivity is often needed to meet the necessary requirements. For example, 2 g locking sensitivity may be desired for strap acceleration, and 5 g sensitivity may be required for the vehicle acceleration. This can be provided in a number of ways. The vehicle acceleration sensitivity can be minimized by minimizing the mass of the inertia mass, and the mass may be concentrated spaced outwardly from the rotational axis of the mass to thereby maximize the sensitivity to rotational strap acceleration.

With the above-mentioned conical tube support system for the inertia mass, balls are captured in grooves in the inertia mass conical end surfaces, and the grooves are formed so that rotational displacement of the inertia mass can occur much more readily than transverse displacement.

To provide a manual reset feature, there is, in one form of the invention, a reset control which rotates a cam to move it out of axial alignment with the latch dog. After the cam has been so moved, a spring biases the cam into radial alignment with the latch dog. Rotating the cam back to its original position allows the cam to engage and lift the latch dog to pivot its pawl out of locking engagement with the ratchet wheel on the reel, thus resetting the mechanism.

The unique inertia mechanisms are, of course, useful in other acceleration sensitive applications besides that of a vehicle.

The concept of supporting an inertia mass in the manner summarized above for multi-directional movement constitutes a method form of the invention. Connecting the mechanism to control the latching of a strap reel in a vehicle restraint system constitutes a more specific form of the method of the invention.

DETAILED DESCRIPTION OF THE EMBODIMENT OF FIGS. 1-10

Figure 1:
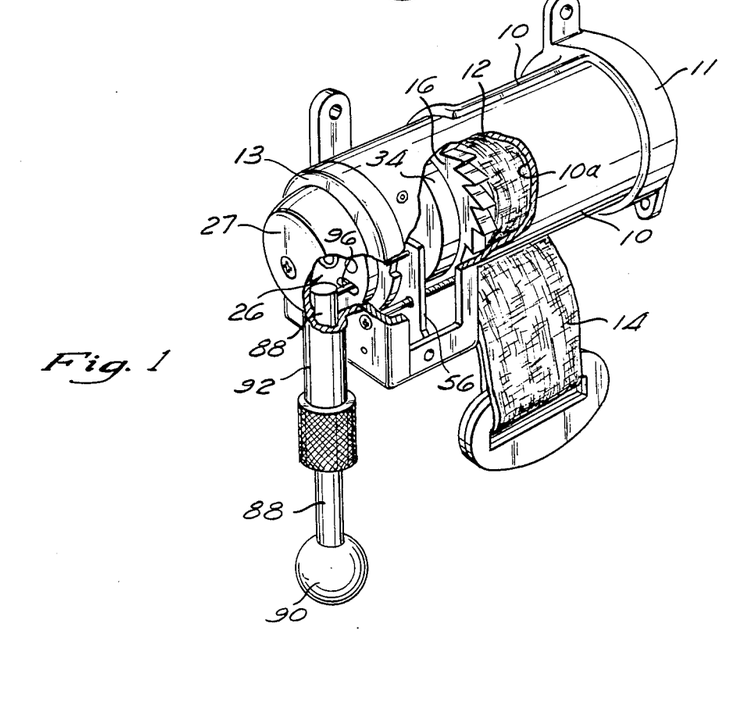
FIG. 1 is a perspective, partially cutaway view of an inertia reel incorporating the present invention.
Figure 2:
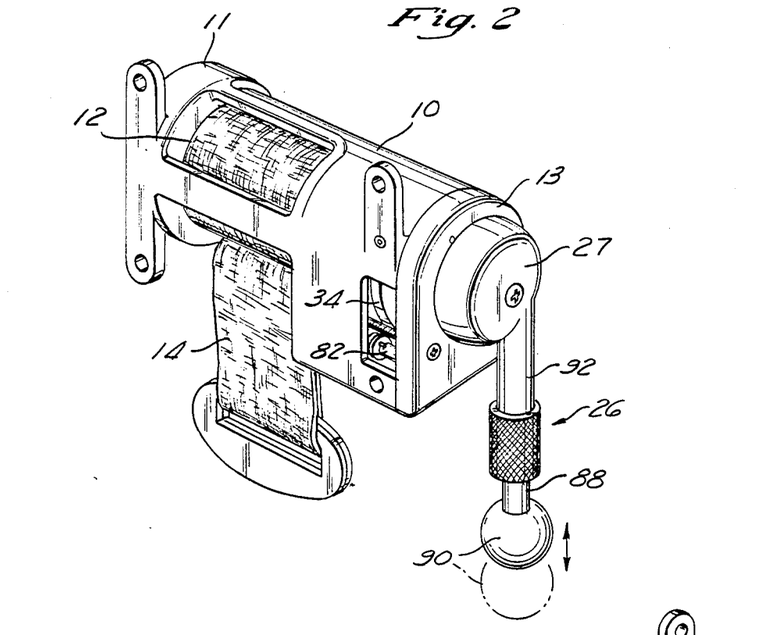
FIG. 2 is a perspective view of the other side of the reel of FIG. 1.

Referring first to FIGS. 1 and 2, there is shown an inertia reel including a generally cylindrical housing 10 having lugs for attaching the reel to a support. Since the reel can be used in a variety of situations, the housing is to be suitably formed to attach to whatever structure is involved in the particular application. The use for which the unit was initially designed is an attachment to a seat or chair for a pilot or other occupant in an aircraft, such as a fighter plane or a helicopter. Since the primary use of the new inertia sensing mechanism of the invention is to sense vehicle acceleration, the housing is to be attached to a structure which is fixed to the vehicle.

Rotatably supported in the housing inner wall 10a is a reel 12 having wound thereon a strap 14 or other flexible restraining element. A conventional retracting spring (not shown) is mounted in the right end 11 of the housing 10, as viewed in FIG. 1, which provides a constant biasing force to urge the strap into its retracted position. A ratchet wheel 16 on the other end of the reel is fixed to rotate with the reel, and a locking means such as a pivotally mounted latch dog or lever 20, shown in FIGS. 6 and 7, cooperates with the ratchet teeth to lock the reel in certain circumstances. At FIG. 6, a strap sensitive control or locking mechanism 22 controls the movement of the latch dog 20 to cooperate with the ratchet wheel 16 based on strap acceleration. In accordance with the invention, a further control or inertia responsive mechanism, generally indicated at 24, see FIGS. 3, 4, 5, and 6 is located in the same end of the housing with the strap sensitive mechanism and further controls operation of the latch dog and its cooperation with the ratchet teeth. Housing end cap 13 in FIGS. 1 and 2 further encloses the mechanism 24. A manual reset mechanism 26 is located adjacent to the control mechanism 24 and positioned within an end cover 27.

Figure 6:
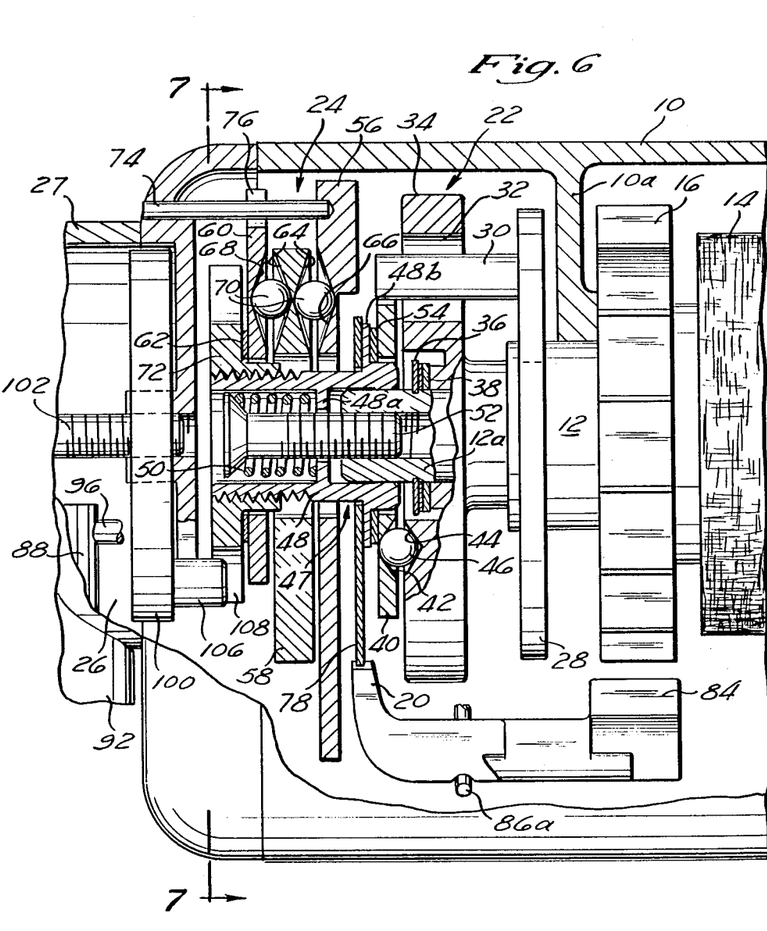
FIG. 6 is a cross-sectional view of the control mechanism of FIG. 3 in a plane including the axis of the reel.

Referring still to FIG. 6, the control mechanism 22 includes a drive disc 28 which is fixed to the reel shaft 12a and carries, on a radially outer portion, an axially extending drive pin 30. This pin 30 extends through an enlarged opening 32 in a disc-shaped inertia mass 34, which is rotatably mounted on a shaft 12a of the reel 12. The mass 34 is held against a shoulder on the shaft by a snap ring 36, or other suitable means mounted on the shaft 12a. Washers 38 are positioned between the retaining ring and the hub of the inertia mass 34 as necessary.

The strap sensitive control mechanism 22 further includes a washer-shaped thrust plate 40 which surrounds the reel hub 12a and extends radially, parallel to the inertia mass 34. The drive pin 30 extends into an opening in the thrust plate 40 so that it rotates the thrust plate 40 as the reel and the drive disc 28 rotate. The axial face of the thrust plate 40 which faces the inertia mass 34 is formed with a plurality of recesses 42. In the arrangement shown, there are three equally spaced recesses, and they each have a shallow conical shape or profile. The axial face of the inertia mass 34 which faces the thrust plate 40 is similarly formed with three conical recesses 44, which are axially and circumferentially aligned with the recesses 42 in the thrust plate. A ball 46 is positioned in each of the mating pair of recesses, with the balls being dimensioned such that the thrust plate is spaced slightly from the inertia mass, as may be seen in FIG. 6. The thrust plate is urged axially toward the inertia mass by means to be described such that the inertia mass is rotatably driven by the recess and ball arrangement as the thrust plate rotates, but the inertia mass 34 is movable independently of the thrust plate a limited amount since the opening 32 in the inertia mass through which the drive pin 30 extends allows such relative movement. The set of three balls 46 separates the thrust plate and the inertia mass, and provide low friction three-point stability to maintain the parallel relationship between the two components.

The strap sensitive assembly 22 and the vehicle sensitive control assembly 24 both utilize a trip or trigger assembly 47 that cooperates with the latch dog 20 for latching and unlatching the reel. This assembly includes a tubular sleeve or hub 48, one end of which is designed to slidably fit onto the end of the reel shaft 12a. This sleeve includes an inwardly extending annular wall or flange 48a located about midway within the sleeve as seen in FIG. 6. A calibration spring 50 engages this wall 48a and surrounds a calibration screw 52 which extends through the sleeve and threads into the end of the reel shaft 12a. The calibration spring 50 is compressed between the head of the screw and the inner wall 48a.

Note that the end of the sleeve closest to the end of the reel shaft 12a fits through the thrust plate 40 to loosely position it. In addition, there is an outwardly extending flange 48b spaced slightly from the reel end of the sleeve 48. A washer-like spacer 54 extends between the flange 48b and the thrust plate 40. The positioning of the sleeve 48 in the direction toward the reel shaft 12a is thus limited by the stack of components positioned between the flange 48b and the inertia mass 38 mounted on the reel shaft. The recesses 42, 44 and the balls 46 form a portio of that stack. Also, the movement of the thrust plate 40 away from the inertia mass 34 is limited by the sleeve flange 48b and the calibration spring 50 and screw 52. This movement is thus adjustable.

Referring to FIGS. 3-7, the vehicle sensitive control mechanism 24 includes a bulkhead plate 56 which is fixed to the housing 10 by set screws 57 or other suitable means. This plate has an enlarged central opening which surrounds the sleeve 48. Also loosely surrounding the sleeve 48 is a disc-shaped inertia mass 58 and a lift plate 60, together with a spacer washer 62.

Figures 8, 9, 10:
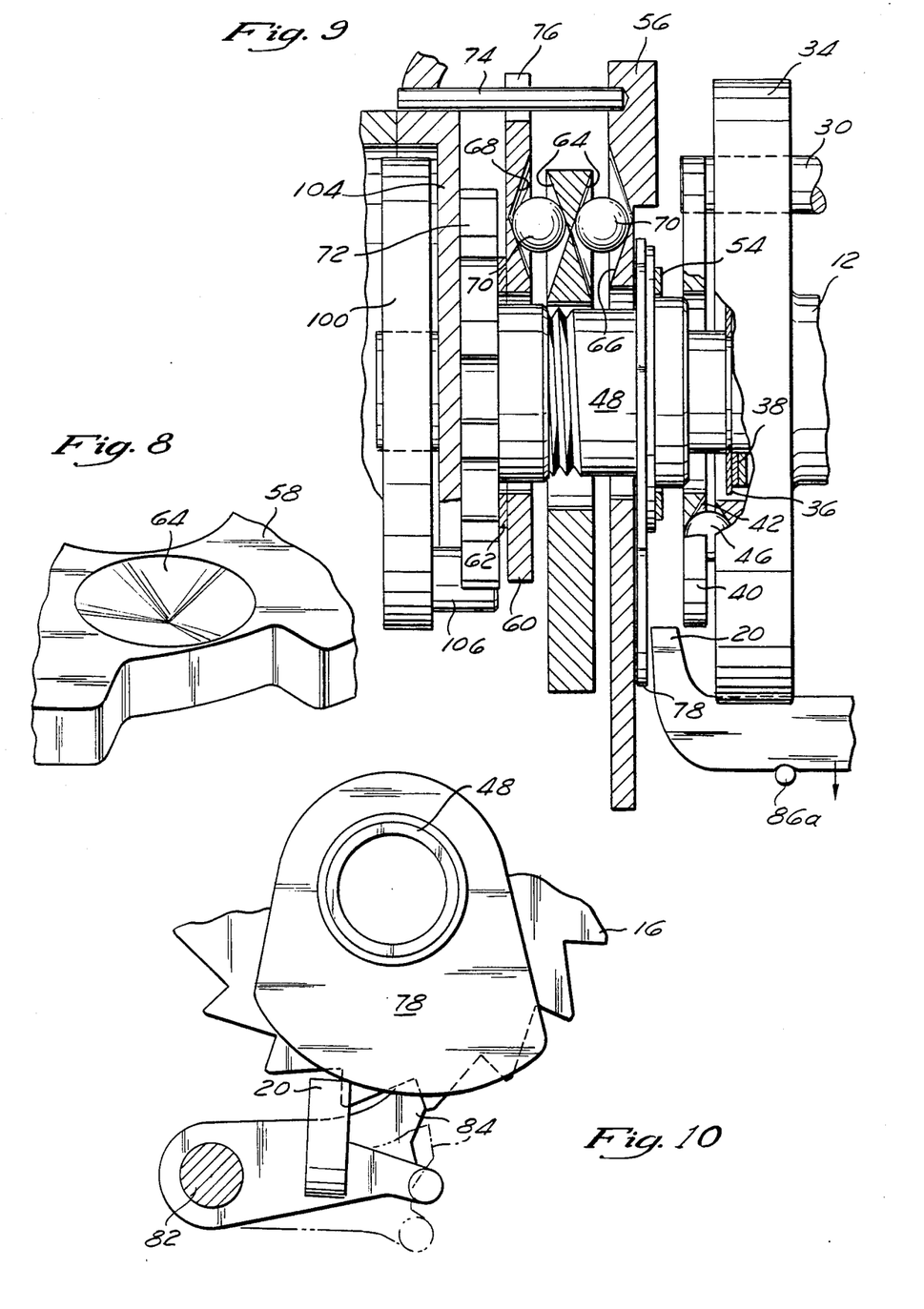
FIG. 8 is an enlarged, fragmentary, perspective view of a recess in the inertia mass of FIG. 3.
FIG. 9 is an enlarged cross-sectional view illustrating the vehicle sensitive inertia mass in operation to release the reel lock mechanism.
FIG. 10 is an enlarged fragmentary view further illustrating the cam of FIG. 3 and its cooperation with a latch dog and ratchet wheel.

The inertia mass 58 is provided with three or more conically shaped recesses 64 on each side or face of the disc. An enlarged showing of the recess is seen in FIG.

8. These recesses are preferably equally spaced and are axially aligned between one face and the other. The bulkhead plate is provided with three similar shallow, conically shaped recesses 66 which face and are aligned with recesses 68 in the inertia mass. Further, the lift plate is provided with three shallow conical recesses 68 in the face of the plate which faces the inertia mass. These recesses 68 are likewise equally spaced and aligned with the recesses 64 in the adjacent face of the inertia mass. Within these mating recesses on each side of the inertia mass are positioned three balls 70 which radially and axially position the inertia mass. With the balls centered in the recesses as shown in FIG. 6, the inertia mass is spaced from both the bulkhead plate and the lift plate, and thus it is free to move on the balls radially, as well as axially, away from the fixed thrust plate.

These components are stacked against the thrust plate 40 by a flange-like retainer 72 attached to the end of the sleeve 48. In the arrangement shown, this retainer is threaded onto the end of the sleeve and thus provides a means for accommodating tolerances in holding the intermediate components against the thrust plate. The retainer 72, together with the sleeve 48, can be moved axially away from the reel shaft 12a by the lift plate 60 against the urging of the calibration spring 50 in the opposite direction. Three pins extending between the bulkhead plate 56 and the end cap 13, and through the outer edges of the lift plate 60 guide the axial movement of the lift plate while preventing rotation.

Fixed to the sleeve flange 48b is a rotary cam 78 which extends radially outwardly toward the latch dog 20. As may be seen from FIGS. 3 and 5, the rotary cam operative portion extends circumferentially about 30°. The latch dog 20 is fixed to a pin 82 which is pivotally mounted in the housing wall 10a and the end cover 13. The end of this latch dog 20 opposite from the cam 78 has a pawl 84 which cooperates with the teeth on the ratchet wheel 16. A spring 86 surrounding the pivot pin 82 attached to the latch dog 20 includes a finger 86a that engages a portion of the latch dog 20 to urge the pawl 84 into engagement with the ratchet teeth 16. The cam 78, on the other hand, engages the latch dog 20 to hold the pawl 84 out of engagement with the ratchet teeth 16 when the cam is positioned, as shown in FIG. 5.

Figures 3, 4, 5:
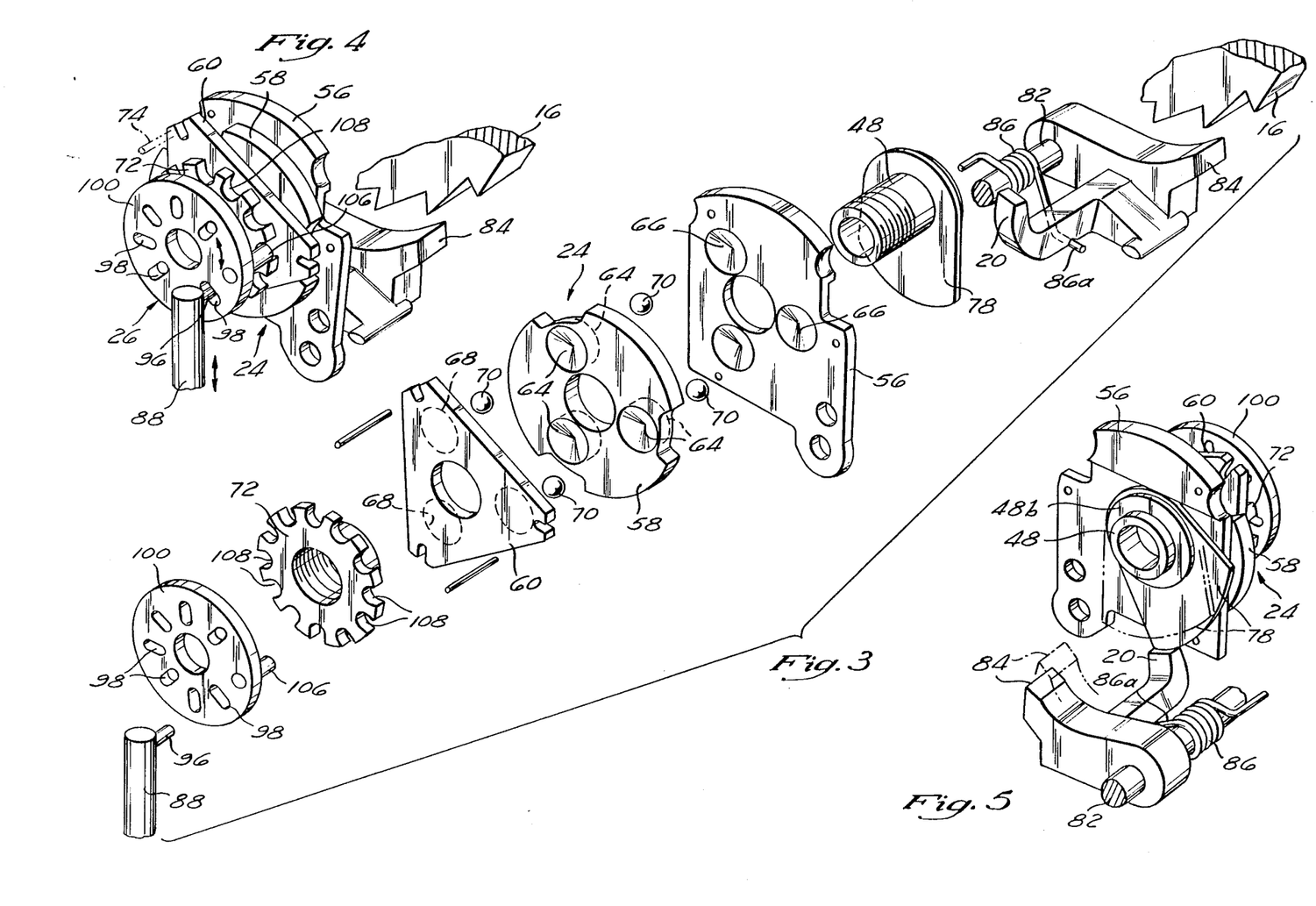
FIG. 3 is an exploded perspective view of the vehicle sensitive components of the invention.
FIG. 4 is a perspective view of the components of FIG. 3 in assembled form.
FIG. 5 is a perspective view of the components of FIG. 3 taken from an orientation opposite that of FIG. 4.

Referring to FIGS. 3 and 4, the reset mechanism 26 includes a push/pull rod 88 having a knob 90 on its outer end for gripping by the operator, as seen in FIGS. 1 and 2. This rod extends through a sleeve 92 formed integral with the end cover 27 on the housing 10. The inner end of the pull rod includes an axially extending pin 96 that fits within a radially extending slot 98 formed in a washer-shaped force transmitter 160. This member is mounted on a screw 102 that holds the end cover 27 to the cap 13, as may be seen in FIG. 6. The force transmitter 100 includes a pin 106 positioned near its outer periphery and extending axially through the support wall and into one of a plurality of notches 108 formed on the outer periphery of the retainer.

OPERATION OF INERTIA SENSITIVE MECHANISMS

Figure 7:
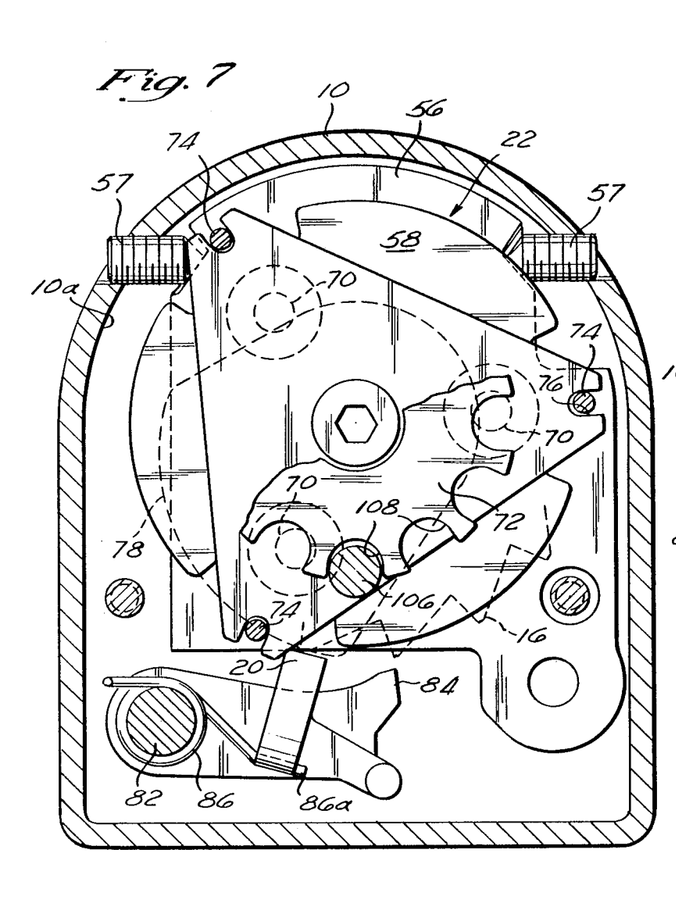
FIG. 7 is a cross-sectional view on line 7—7 of FIG. 6.

In normal operation, the components are as shown in FIGS. 6 and 7 wherein the cam 78 engages the latch dog 20 and holds the pawl 84 out of engagement with the ratchet wheel 16. The reel is thus free to rotate, allowing the strap 14 to be extended or retracted. During this rotation of the reel, the drive disc 28 rotates, causing its drive pin 30 to move in a circular path and rotate the thrust plate 40. The rotation of this plate in turn rotates the inertia mass 34 by virtue of the interconnection between the recesses 42, 44 and the balls 46.

Although the inertia mass 34 has inertia tending to keep it stationary, the acceleration of the reel during normal rotation is sufficiently slow that the inertia mass is readily rotated. However, if the strap 14 is suddenly extended by virtue of a pilot starting to be thrown out of his chair, the inertia of the mass 34 will cause it to rotationally lag with respect to the rotation of the thrust plate 40, which is positively driven by the reel. Note that the slot 32 within the inertia mass 34 is sufficiently large to permit the inertia mass to lag with respect to the drive pin 30 that extends through the inertia mass. This rotational lag of the inertia mass is also permitted by the ball and recess arrangement. That is, the balls 46 will roll on the conical walls of the recesses 42, 44. This action will push the thrust plate 40 away from the inertia mass, which in turn will push the sleeve 48 axially away from the inertia mass and will thereby move the cam 78 axially out from beneath the latch dog 20 into the position shown in FIG. 9. With the latch dog 20 released, it will rotate under the urging of the spring 86 so that its pawl 84 engages the ratchet wheel 16, as shown in FIG. 10.

Turning now to the vehicle sensitive control 24, if the vehicle is suddenly decelerated in a crash situation, this deceleration will be sensed and cause the reel to be locked. For example, if the vehicle and the reel housing 10 are falling and then engage an obstruction, such as a tree, the reel housing will suddenly decelerate but the inertia mass 58, by virtue of its inertia and its free mounting, will continue to move downwardly, causing the ball 70 to, in effect, roll up the conical recess walls as illustrated in FIG. 9. This action will move the lift plate 60 axially, as shown, together with the retainer 72 and the sleeve 48 against the urging of the calibration spring 50. This, in turn, will move the cam 78 from beneath the latch dog into the position shown in FIG. 9. Thus, the latch dog 20 is free to pivot so that its pawl 84 once more engages the ratchet wheel 16, thereby locking the reel.

It should be noted that the inertia mass is free to move in any direction except directly toward the bulkhead plate 56. That is, it can move radially in or out, can move axially away from the bulkhead plate 56, and in any direction having such axial or radial components. Thus, the inertia mass is a multi-directional sensor. Typically, the reel will be mounted on the seat or vehicle structure above and behind the user's chair, with the axis of the reel extending horizontally. With that orientation, the vehicle sensitive lock mechanism will cause the reel to lock in a crash situation involving acceleration or deceleration forces in any direction except in one totally sideways direction. A crash situation with only one totally sideways acceleration is extremely rare. However, rebound acceleration due to this shock pulse will cause the mechanism to activate. Thus, for practical purposes, the vehicle sensitive control mechanism is omni-directional. It should also be noted that the strap can be retracted at any time even though further extension is prevented by the latch dog. The spring in end cap 11 urges retracting.

OPERATION OF RESET MECHANISM

The inertia sensitive mechanisms described above are self-restoring in the sense that they are spring-biased by the calibration spring 50. Also, the sleeve 48 and the cam 78 carried by the sleeve want to move axially under the urging of the calibration spring into position wherein the cam is radially aligned with the latch dog 20. However, for many applications, particularly military applications, it is desired that the reel remain locked until the user takes action to manually unlock the reel. To do this and reset the inertia sensitive mechanisms, it is only necessary to push and then pull knob 90 attached to the pull rod 88 in FIGS. 1 and 2. Moving the pull rod in one direction, as viewed in FIG. 4, will rotate the transmitter 100 in one direction, which in turn will cause its drive pin 106 to cooperate with a notch 108 in the retainer 72 on the end of the sleeve 48. This will cause the sleeve 48 to rotate together with the cam 78. Rotation of the cam moves it out of axial alignment with latch dog 20. Thus, the sleeve and its cam 78 are free to move axially under the urging of the calibration spring 50 so that the cam is once more radially aligned with the latch dog. Moving the pull rod 88 in the opposite direction then rotates the cam to urge the latch dog radially, thereby pivoting the latch dog into the unlocked position freeing the ratchet wheel 16 from the pawl 84. The reel is then once more free to rotate, and the inertia sensitive lock mechanisms are reset to function again.

It should be understood that the vehicle sensitive inertia mechanism is in effect redundant with respect to the strap sensitive device, in that in most emergency situations in which the strap sensitive device will function in a manner to move the cam and release the latch lever, the vehicle sensitive mechanism will also function. Redundancy is, however, desirable from a safety standpoint so long as the cost is not high in terms of weight, size or money.

One of the desirable features of the arrangement disclosed is that the vehicle sensitive mechanism is compact and fits within one end of the reel requiring only a slight amount of space in addition to that normally required for a reel having a strap sensitive locking mechanism of the general type disclosed herein. This is accomplished by virtue of the clever vehicle sensitive inertia mechanism and by having both inertia mechanisms operating a single trip assembly with a single cam to release a single latch dog on a single ratchet wheel.

Providing both the strap sensitive and vehicle sensitive mechanisms also offer versatility. For example, the strap sensitive mechanism can be set so that it will function to lock the reel simply based on sudden occupant movement occurring when there is no sudden change of vehicle velocity. Also, the strap sensitive mechanism can be adjusted to lock at a different acceleration than the vehicle sensitive mechanism, although in many applications the vehicle sensitive mechanism will function as soon as the other one.

As alluded to above, it should be noted that the unique inertia sensitive mechanism in the control 24 may also be useful in apparatus other than a vehicle restraint system. That is, it may be useful in any mechanism wherein multi-directional inertia sensing is desired.

It should also be noted that while the unique ball and recess control mechanism is utilized to trigger mechanical movement of the sleeve-like trip assembly disclosed above, which in turn mechanically releases a mechanical lock, the relative movement of the inertia mechanism may be utilized to trigger other mechanisms, by they electrical or chemical in nature and be they in accordance with now-known mechanisms or mechanisms to be developed in the future.

Figures 11, 12:
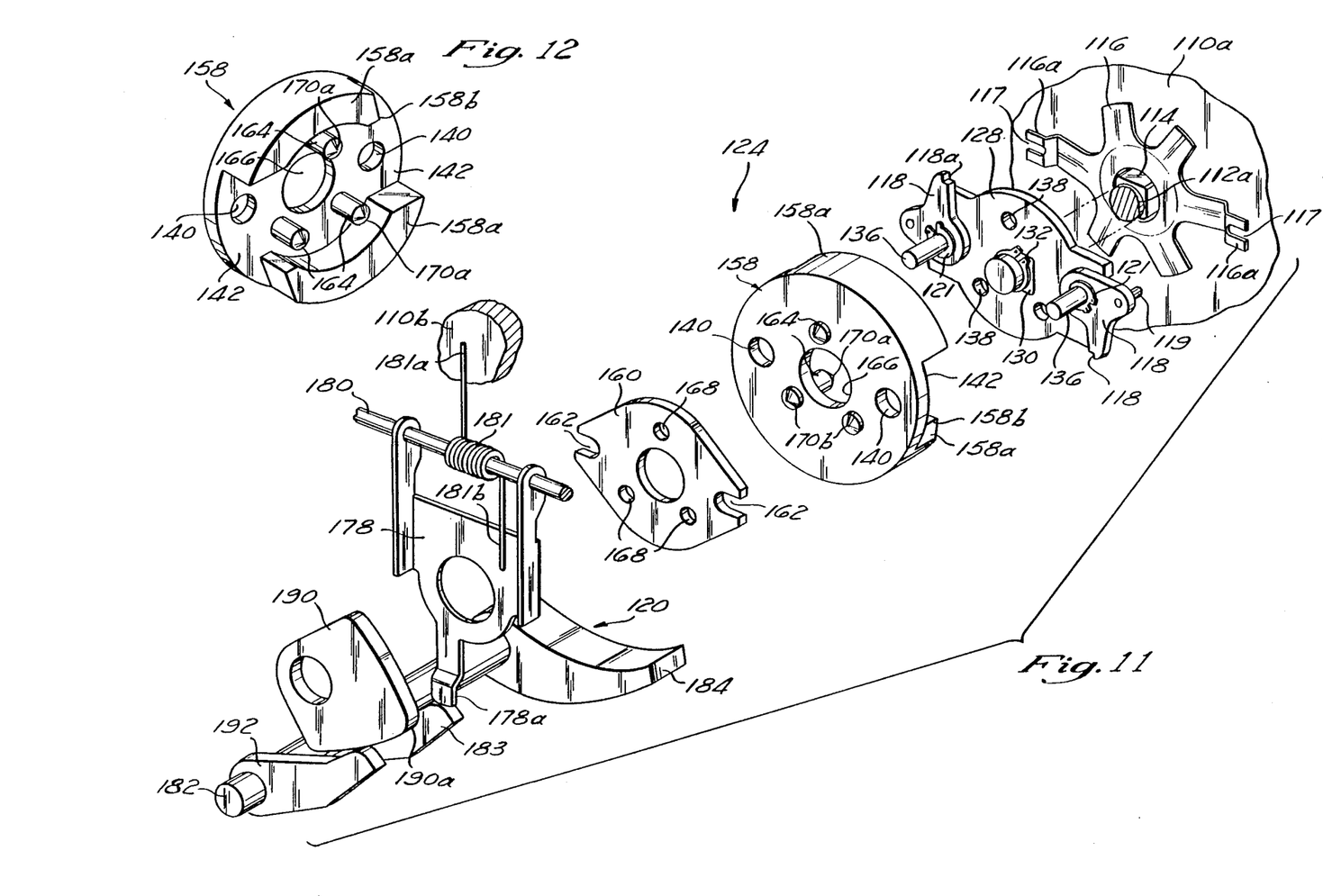
FIG. 11 is an exploded perspective view of another form of the invention wherein a single inertia mass is sensitive to both vehicle and strap acceleration.
FIG. 12 is a perspective view of the other side of the inertia mass shown in FIG. 11.
Figures 13A, 13B:
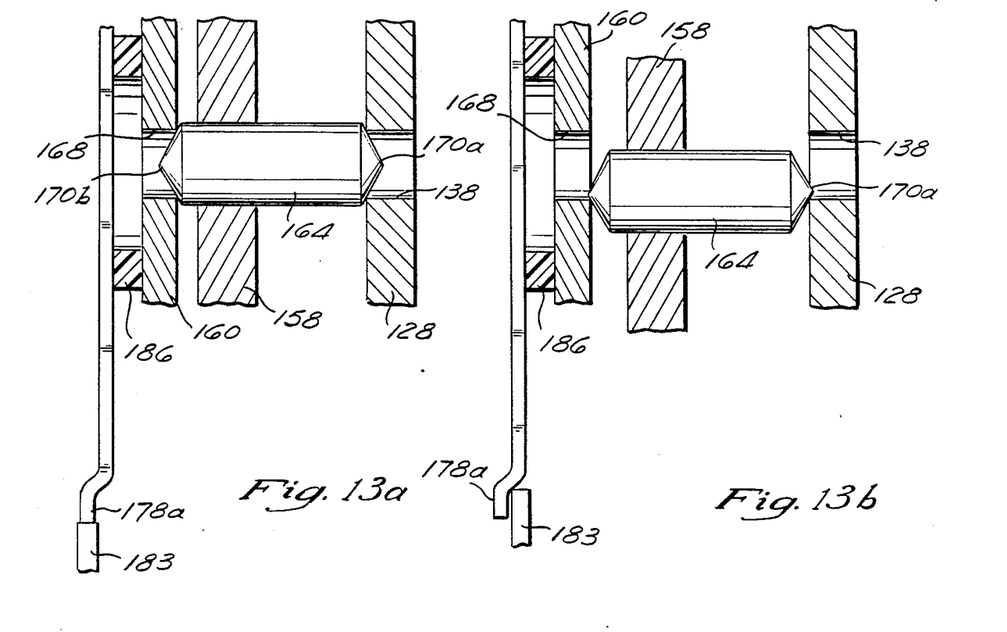
FIG. 13a is an enlarged sectionalized view of a portion of the structure of FIG. 11 for supporting the inertia mass.
FIG. 13b is an operational view showing the inertia mass of FIG. 13a wherein the inertia mass is transversely displaced and the latch dog for the reel is released.

DETAILED DESCRIPTION OF THE EMBODIMENT OF FIGS. 11-13

The arrangement of FIGS. 11-13 fits within the left end of the housing 10 shown in FIG. 1, and replaces the strap sensitive locking mechanism 22 and the vehicle sensitive control mechanism 24 of FIG. 6. This includes a simplified inertia responsive system or mechanism 124 that cooperates with the reel 12 with its ratchet wheel 16 mounted within the housing 10. FIG. 11 shows a housing wall 110a which is comparable to the wall 10a of FIG. 6, and further shows a reel shaft 112a extending through the wall 110a. The ratchet wheel 16 (not shown in FIG. 11) could be positioned on the other side of the wall 110a.

The control mechanism 124 includes a drive plate or disc 128, a generally disc-shaped inertia mass 158 and a driven disc 160. The drive disc 128 includes a square central opening 130 that fits onto a square-shaped portion 114 on the shaft 112a so that the disc 128 rotates with the shaft 112a and the reel 12. A snap ring 132 on the shaft 112a holds the disc 128 in driven relation on the shaft portion 114.

A pair of diametrically spaced, axially extending torque pins 136 are mounted in cantilever fashion in the disk 128. Three axially extending holes 138 are formed in the disc 128, the holes being equally spaced circumferentially and radially with respect to the central opening 130 in the disc 128. The pins 136 are aligned with and extend axially through a pair of holes 140 in the inertia mass 158 and into a pair of diametrically located slots 162 in the drive disc 160. The holes 140 are sufficiently larger than the pins 136 so that the inertia mass 158 is not driven directly by those pins, and the mass can move axially with respect to the pins. The slots 162 fit fairly closely on the pins 136 so that the drive disc rotates with the disc 128, and hence the reel 12. The drive disc 160 can, however, be displaced axially on the pins 136.

As seen in FIGS. 11 and 12, the inertia mass 158 has a pair of large circumferential lugs 158a extending axially from the face of the disc toward the drive disc 128. The circumferential edges of the lugs 158a are spaced considerably, thus forming a pair of diametrically spaced gaps or notches 142.

Extending through and embedded in the inertia mass are three support posts 164 which are equally spaced radially outwardly from an enlarged central hole 166 in the inertia mass and are equally spaced circumferentially. These posts are aligned with the holes 138 in the drive disc 128, and thus are spaced radially outwardly from the rotational axis of the reel the same distance as the holes 138. Also, the drive disc 160 is provided with three holes 168 which are axially aligned with the posts 164 and the holes 138. The ends 170a of the posts 164 are conically shaped to fit within the holes 138 and the ends 170b with the holes 168, as shown more clearly in FIG. 13a. The inertia mass 158 and the discs 128, 160 are spring-biased in stacked relationship so that the inertia mass 158 is supported by the discs 128, 160 as a result of the cooperation between the ends of the posts 164 and the holes 138, 168.

A plate-like sear 178 is pivotally mounted on a pin 180, which in turn is supported by the housing 10. A spring 181 surrounds the pivot pin 180, with one end 181a of the spring being fixed, biased against a portion 110b of the housing 10, and the other end 181b engaging the sear 178 and biasing it axially toward the driven disc 160. This keeps the mass 158 supported by the discs in any orientation. A washer 186 (not shown in FIG. 11) is shown in FIG. 13a between the sear 178 and the disc 160.

The sear 178 includes a finger 178a which engages an arm 183 mounted on a latch dog shaft 182 of a latch dog mechanism 120. The shaft 182 is pivotally mounted in the housing 10. The latch dog mechanism 120 includes a pawl 184, which, analogous to the pawl 84 in FIGS. 3-7, cooperates with the teeth of the ratchet wheel 16. A spring (not shown), comparable to the spring 86 in FIG. 3, biases the pawl 184 into latching engagement with the ratchet wheel 16.

A reset cam 190 cooperates with another finger 192 affixed to the latch dog shaft 182.

Included in the system of FIG. 11 is a mechanism for preventing backlash of the ratchet wheel when the restraining strap is being retracted. This includes an annular retraction, anti-backlash, spring-like finger member 116 on the reel shaft 112a sandwiched between the housing wall 110a and the drive disc 128. Two of the fingers 116a, which are diametrically spaced from each other, extend radially beyond the others and have a small slot 117 formed therein. A pair of anti-backlash levers 118 are respectively mounted on each of the drive pins 136. The levers each include a small drive pin 119 embedded therein. The outer end of the drive pin 119 extends into the slot 117 in finger 116a. Another end of the lever 118 has a notch 118a therein adapted to accommodate one edge 158b of the inertia lug 158a of the inertia mass. The anti-lock levers 118 are held in position on the drive pins 136 by retaining elements 121.

OPERATION OF THE INERTIA MECHANISM OF FIG. 11

As the restraining strap is extended or retracted, the reel 112 rotates together with its shaft 112a. Torque is transmitted to the drive disc 128 by means of the square-shaped cross section 114 on the shaft. This rotational movement is in turn transmitted to the driven disc 160 by means of the torque transmitting pins 136. The disc 160 is biased onto these pins by the sear 170 and its spring 181. Also, the sear holds the support posts 164 carried by the inertia mass into the mating holes 138 in the drive disc 128 and the mating holes 168 in the drive disc 160. This relationship is illustrated in FIG. 13a. With the inertia mass supported in this manner, it will rotate with the discs 128, 160, so long as there are not inertial forces sufficient to displace it. As seen from FIG. 13a, the conical tips 170a and 170b are concentrically positioned within the holes 138 and 168, respectively. This allows the conical tips to penetrate the maximum amount into the holes. Since the diameter of the posts 164 is greater than the diameter of the holes 138, 168, the conical tips engage the circular end of the adjacent holes. In this position, the sear finger 178a engages the arm 183 of the latch dog 120, as shown in FIGS. 11 and 13a. This holds the pawl 184 out of engagement with the ratchet teeth so that the reel is free to rotate.

If, however, the strap is subjected to a sudden extending force, or the housing 10 is subjected to a sudden deceleration, the inertia mass 158 will lag such sudden acceleration and shift in a plane transverse to the axis of the pin 112a. If the lagging is due solely to strap acceleration, the transverse movement would be in an arcuate path. If it is caused by the vehicle, it can be in any transverse direction. Many forces on the housing will be a combination which will produce an axial load as well as a transverse load. The transverse component of such load will produce the transverse movement. This transverse movement is indicated in FIG. 13b wherein the inertia mass has shifted transversely or radially with respect to the discs 128, 160. That is, the conical tip 170a has moved in sliding engagement on the circular end of the hole 138, and the conical tip 170b has moved in sliding engagement on the circular end of the hole 168. This places the center line of the conical tips closer to the edge of these openings, as clearly seen in FIG. 13b.

The interengagement between the tip 170a and the hole 138 shifts the inertia mass 158 axially further away from the disc 128. This same axial displacement is transmitted by the post tip 170b to the disc 160 so that the disc 160 is shifted axially further away from the disc 128. Simultaneously, the tip 170b slidably engaging the circular end of the hole 168 shifts the disc 160 axially further away from the inertia mass 158. This combined displacement pivots the sear 178 about its pivot pin 180, causing the sear finger 178a to be moved axially out of alignment with the arm 183 releasing the latch dog 120. With the latch dog no longer rotationally restrained by the sear, its spring urges the pawl 184 into engagement with the ratchet teeth. It should be noted that the axial displacement of the drive disc 160 moving sear 178 is amplified at the finger 178a, it being further from the pivot pin 180 than the area of engagement of the disc 160 to the sear 178 through the washer 186.

To reset the inertia sensitive mechanism, the operator utilizes the knob 90 and pull rod 88 of FIGS. 1 and 2 to rotate a stub shaft (not shown) carrying the cam 190 so that its lobe 190a rotates the latch dog 120 causing its pawl 184 to be moved out of engagement with the ratchet teeth. When this occurs, the sear spring 181 urges the sear 178 axially toward the inertia mass 158, causing the sear finger 178a to be once more aligned with the arm 185 to hold the latch dog in its unlocked position.

The anti-backlash lock means prevents the reel from possible locking in response to movement of the inertia mass when the strap is being retracted. The anti-lock spring member 116a resists rotation due to its frictional engagement with the housing wall 110a. However, the rotation of the disc 128 carries its torque pins 138 in an arcuate path, which in turn carries the anti-lock levers 118. Consequently, the drive pins 119 of the anti-lock levers 118 cooperate with the slotted fingers 116a of the member 116 to rotate the member 116. During strap unwinding rotation of the reel, the frictional resistance of the spring member 116 pivots the anti-lock levers 118 about the torque pins 136 in a direction to hold the lever tips 118a out of engagement with the edges 158a on the inertia mass lugs so that the levers do not lock the inertia mass 158. However, during rotation of the reel in the strap winding direction, the frictional drag produced by spring member 116 pivots the anti-backlash levers 118 so that their edges 118a are in engagement with the edges 158b of the inertia lugs to positively restrain the inertia mass, thereby preventing it from lagging with high inertia forces.

It should be noted that two of the anti-backlash levers are needed since the inertia mass is free to be displaced transversely as well as rotationally. Thus, during rewinding, at least one of the anti-lock levers 118 will restrain the inertia mass with the start of a transverse displacement in any direction.

EMBODIMENT OF FIG. 14

Figure 14:
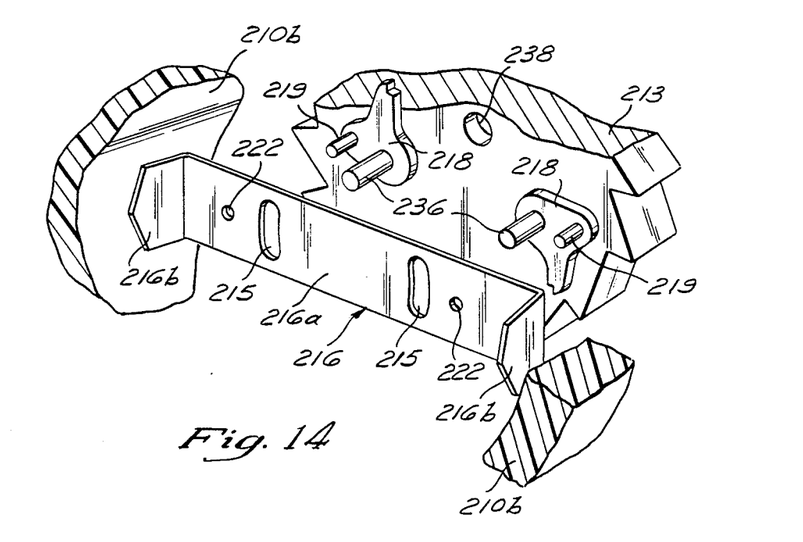
FIG. 14 is an exploded perspective view of a portion of an alternative form of the mechanism of FIG. 11 wherein the driving member for the inertia mass is the ratchet wheel on the reel. Also illustrated is an alternative form of an anti-backlash spring.

FIG. 14 illustrates an alternative arrangement for providing the necessary frictional drag to operate the anti-backlash feature. Instead of utilizing the spring member 116, there is provided a so-called garter spring 216 which includes a flat metal strip having a diametric central section 216a and a pair of end portions 216b which frictionally engage the wall 210b of the reel case which is preferably plastic with this spring. The central section 216a includes a pair of arcuate slots 215 through which extends a pair of torque pins 236 which rotate with a ratchet wheel 213. An anti-backlash lever 218 is pivotally mounted on each of the torque pins 236. An anti-backlash drive pin 219 extends axially from one portion of the anti-lock levers 118 through holes 222 in the spring 216. Rotation of the reel in strap unwinding direction causes the pins 236 to rotate the spring. As the spring rotates the lever pins 219 are acted on by the spring holes 222 causing the spring 216 to pivot the anti-backlash levers 218 in a direction to keep them out of engagement with the inertia mass of FIG. 11, but rotation of the reel in the strap winding direction causes the other end of the spring holes 222 to pivot the anti-backlash levers 118 in the opposite direction so that one or the other of both of the anti-backlash levers will engage the inertia mass to drive it, and thus prevent locking displacement.

In addition to the anti-backlash spring arrangements of FIGS. 11 and 14, the anti-backlash levers may be caused to lockingly engage the inertia disc with rotation in the strap winding direction without the use of springs. This can be accomplished by the inertia of the lock lever itself or by centrifugal action. That is, the anti-lock lever can be structured or mounted so that its own inertia will cause it to pivot between an unlocked and a locked position. Similarly, the anti-lock lever can be mounted so that centrifugal force will cause the desired action. Or a combination of these two forces may be employed.

FIG. 14 also illustrates another important variation of the invention wherein the driving torque transmitting disc 128 of FIG. 11 has been eliminated. Instead, holes 238 are formed directly in the ratchet wheel 213. Thus, the conical post ends 170a of the inertia mass 158 can directly engage the holes 238 in the ratchet wheel. It is for this reason that the anti-lock drive pins 219 extend in the opposite direction from that of FIG. 11, so that they can cooperate with the anti-lock spring 216 located between the inertia mass 158 and the ratchet wheel 213.

EMBODIMENTS OF FIGS 15-17

Figure 15:
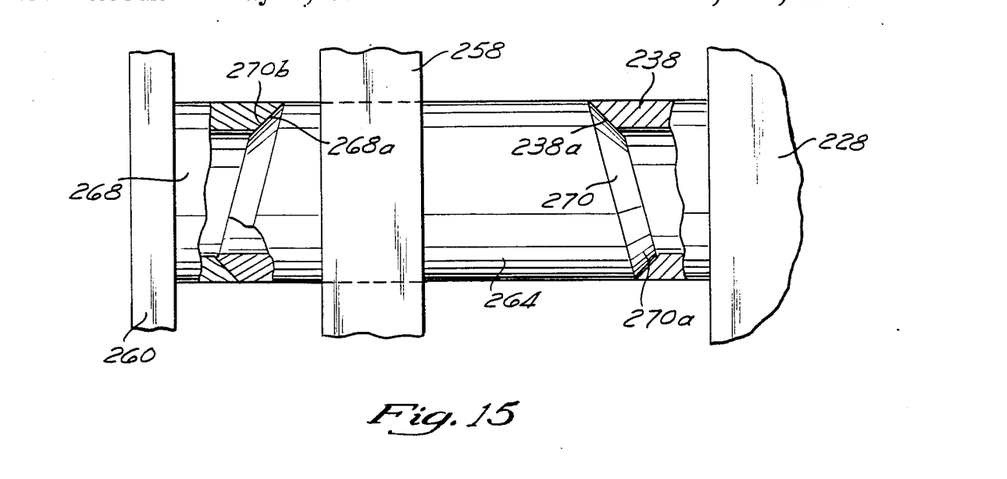
FIG. 15 is an elevational, partially sectionalized view of a tube arrangement for supporting the inertia mass.

FIG. 15 illustrates an arrangement for supporting and driving the inertia mass 258 by means of a tube 264 embedded in and extending through an inertia mass 258. The ends of the tube 264 are tapered to form an annular conical surface 270. These conical surfaces are cut at an angle with respect to the axis of the support tube 264 so that, as that tube rotates, the end surface moves in an axially undulating or spiral path. A drive member 228, which corresponds to the drive disc 128 of FIG. 11 or the ratchet wheel 213 of FIG. 14, carries a centrally positioned stub tube 238 having an annular end surface 238a which is tapered to mate with and fit over the surface 270a of the tube 264. Similarly, the drive disc 260 is provided with a centrally positioned stub tube 268 having a tapered end surface 268a which mates with the tube end 270b.

As the drive member 228 rotates and drives the driven member 260 by torque pins 136 of FIG. 11 (or the pins 236 of FIG. 14), the inertia mass is also driven by virtue of the stub tubes 238, 268 cooperating with the ends 270a, 270b of the tube 264. If the inertia mass 258 is subjected to sudden rotational acceleration, it will rotationally lag and its spiral end surfaces will rotate with respect to the ends of the stub tubes, causing axial displacement to release the latch dog. Similarly, with straight line transverse movement of the inertia mass 258, its annular frusto-conical end surfaces 270 will likewise produce axial displacement of the inertia mass and the driven member 260.

Figure 16:
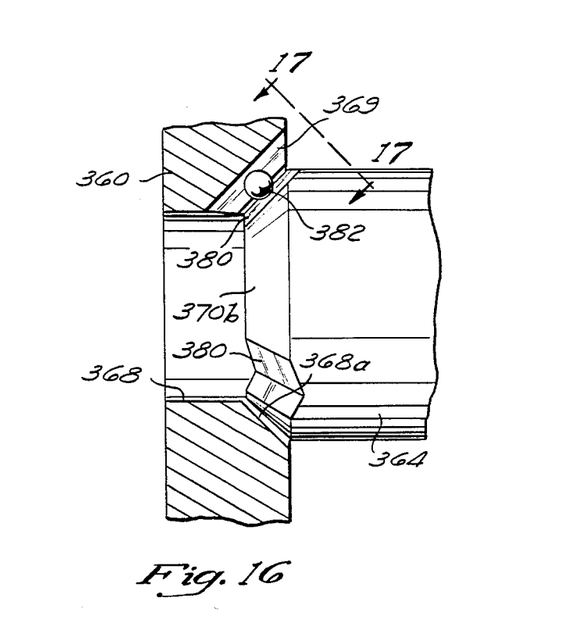
FIG. 16 is an enlarged, elevational, partially sectionalized view illustrating a variation of the tube system of FIG. 15.

It should be noted that if the annular end faces of the tube 264 were not spiraled or axially offset as in FIG. 15, but instead were oriented as in FIG. 16, the inertia mass would still produce displacement for non-rotational transverse movement, and that the spiral is provided to accommodate rotational lagging. Further, it should be noted that the mating surfaces for the tubular support arrangement of FIG. 15 could be reversed, so that the ends of the tubes represent the female portions rather than the male portions as illustrated. Similarly, the post and hole arrangement of FIG. 11 can be reversed. One advantage of the arrangement of FIG. 15 is that a single central support element is needed as opposed to the three posts 164 of FIG. 11.

Figure 17:
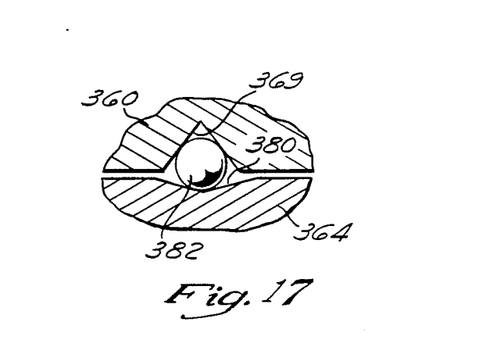
FIG. 17 is a cross-sectional view on line 17—17 of FIG. 6 illustrating the manner in which differing sensitivities for vehicle acceleration and strap acceleration are obtained.

Another variation for supporting the inertia mass is illustrated in FIGS. 16 and 17. A support tube 364 replacing the tube 264 of FIG. 15 is shown having an annular frusto-conical end surface 370b with three shallow grooves 380 that extend toward the center line of the tube 364. The walls of these grooves are not as steep as the slope of the surface 370b. In each groove, there is positioned a ball 382. A driven disc 360, comparable to the driven disc 168 of FIG. 11, is provided with a hole 368 having an annular frusto-conical surface 368a on one end facing the support tube. That surface is provided with three circumferentially spaced grooves 369 which extend in a direction toward the axis of the hole. The sides of these grooves 369 are at a steeper angle than the sides of the grooves 380 in the tube, as is seen in FIG. 17. The balls are captured within the grooves and the dimensioning is such that the members ride on the balls, rather than interengaging directly on their frusto-conical surfaces.

For transverse movement in response to vehicle deceleration, the inertia mass support posts tend to move relative to the support discs against the resistance of the mating frusto-conical surfaces in a manner similar to that in FIG. 11. The sensitivity is determined by the slope of the mating frusto-conical surfaces, just as the sensitivity of the arrangement of FIG. 11 is determined by the slope of the conical post tips 170b. The balls essentially remain centrally positioned in the grooves, as viewed in FIG. 17, because the force is basically up the grooves. Thus, in a sense, the arrangement is operating similar to that of FIG. 11 for vehicle responsiveness.

On the other hand, for rotational sensitivity induced by strap extension, the inertia mass lags relative to the drive disc 360 so that the grooves are no longer rotationally aligned. That is, the ball 382 starts to roll or slide up the shallow ramp in the groove 380 in the tube end 370b. The slope of the shallow grooves 380 on the tube end 370b is less than the slope of the grooves in the axial direction, or as in FIG. 16, is less than the slope of the mating frusto-conical surfaces of the driven member 360 and the tube end 370b. The result of this is that strap sensitivity can be greater than vehicle sensitivity. For example, in some requirements, it is desirable that strap sensitivity be set at 2 g, whereas vehicle sensitivity may be at 5 g. Adjusting the conical surfaces and the groove surfaces as desired allows these design requirements to be met.

Of course, there are other arrangements to vary the sensitivity so that the support arrangements of FIGS. 3 and 11 are both useful. For example, sear spring force may be modified. Further, reducing the mass of the inertia mass decreases sensitivity. Thus, the vehicle sensitivity can be controlled in this manner. Locating the selected mass near the periphery of the disc and minimizing weight in the center of the disc maximizes the rotational sensitivity. Such an arrangement is employed in the inertia mass 158, as seen in FIGS. 11 and 12, in that the central portion of the disc has a hole in it and the outer portion includes the large lugs 158a. The mass can also, of course, be controlled by selection of materials.

While the drawings illustrate the ball and recess support arrangement of FIG. 3, the conically tipped post and hole arrangement of FIG. 11, the frusto-conically tipped tube arrangement of FIG. 15 and the frusto-conical surface with grooves and balls of FIG. 16, it should be appreciated that other arrangements may be employed, for supporting and driving a free inertia mass. In addition to interengaging surfaces, spring arrangements may be employed including elastomers. Further, fluidic, magnetic or electric arrangements may be utilized, all involving the principle of supporting a mass for free movement between a driving and a driven member held in biased relation toward each other.

What is claimed is:

1. An inertia responsive mechanism, comprising:
a pair of spaced members mounted for rotation and for relative movement in an axial direction toward and away from each other;
means interconnecting said members in a manner such that one member rotates the other;
an inertia mass positioned between said members;
means for biasing said members towards each other; and
interengaging means on said mass and said members for supporting said mass between said members in a manner to rotate said mass at low acceleration and to permit the mass to move relative to said members in response to inertia forces at increased acceleration of said members, and in a manner such that movement of said mass relative to said members will cause relative displacement of said members away from each other in opposition to said biasing means.

2. The mechanism of claim 1, wherein said supporting means includes interengaging surfaces which translate movement of said mass relative to said members to cause said displacement.

3. The mechanism of claim 2, wherein said interengaging surfaces include a tapered surface engaging another surface.

4. The mechanism of claim 1, wherein said supporting means includes a plurality of recesses and balls in the recesses.

5. The mechanism of claim 1, wherein one of said members has ratchet teeth formed on its radial outer periphery, said mechanism includes a latch dog mounted to cooperate with said ratchet teeth and prevent rotation of the member having said ratchet teeth, and a sear for holding said latch dog out of engagement with said ratchet teeth, said sear being positioned to be movable by said displacement to release said latch dog to permit it to engage said ratchet teeth.

6. The mechanism of claim 1, wherein said means interconnecting said members comprises a pair of spaced rods which transmit torque from said one member to the other member, and said other member being axially movable on said torque rods.

7. The mechanism of claim 6, wherein said torque rods extend through enlarged openings in said mass.

8. The mechanism of claim 1, wherein one said members is a disc on the end of a reel, and said disc has a plurality of ratchet teeth on its periphery, and including a pawl for engaging said teeth in response to said displacement.

9. The mechanism of claim 1, including:
a rotatably mounted reel connected to rotate one of said members and adapted to receive a strap or other restraining element thereon;
said supporting means permitting the mass to lag in rotation relative to said members when the reel is subjected to a predetermined acceleration in the strap unwinding direction; and
anti-backlash means for preventing said mass from rotating relative to said members when said reel is rotated in the strap winding direction.

10. The mechanism of claim 9, wherein said anti-backlash means comprises a pair of levers mounted to rotate with said mass, said levers being diametrically spaced with respect to said mass and being pivotable from one position wherein said levers engage said mass to prevent rotation of the mass relative to said members when said members are rotated in a strap winding direction, to a second position wherein said levers do not interfere with the rotation of said mass in the strap unwinding direction.

11. The mechanism of claim 10, wherein said anti-backlash means includes a spring which resists rotation and is mounted to pivot said levers between said first and second positions.

12. The mechanism of claim 11, wherein said inertia mass is generally a disc shape with a pair of diametrically spaced substantial lugs extending from one face of the mass, said anti-backlash levers are between said lugs, and including a flat spring extending diametrically across said lug interconnected to said levers to pivot said levers between said first and second positions, said spring further including a pair of end portions which frictionally engage a housing enclosing said mechanism whereby the friction generated by said spring is utilized to pivot said levers.

13. An inertia responsive mechanism, comprising:
a pair of spaced members mounted for relative movement in an axial direction toward and away from each other;
an inertia mass positioned between said members;
means for biasing said members towards each other; and
means for supporting said mass between said members in a manner to permit the mass to move relative to said members in response to changes in acceleration of said members, and in a manner such that movement of said mass relative to said members will cause relative displacement of said members away from each other in opposition to said biasing means;

said supporting means comprises a plurality of posts secured to said mass having ends which extend toward said members, each of said members having a plurality of holes formed therein facing said mass which are aligned with said posts, said post ends being tapered to engage the edges of said holes in a manner such that transverse movement of said mass relative to said members will cause the post ends to slide on the edges of said holes and cause the mass to move axially away from at least one of said members, and will cause at least one of said members to move away from the other member.

14. The mechanism of claim 13, wherein the ends of said posts are substantially conical.

15. An inertia responsive mechanism, comprising:
a pair of spaced members mounted for relative movement in an axial direction toward and away from each other;
an inertia mass positioned between said members;
means for biasing said members towards each other; and
means for supporting said mass between said members in a manner to permit the mass to move relative to said members in response to changes in acceleration of said members, and in a manner such that movement of said mass relative to said members will cause relative displacement of said members away from each other in opposition to said biasing means;
said mass includes an axis parallel to said axial direction and said supporting means includes an annular surface concentric with said axis on opposite sides of said mass respectively facing said members, said members each including an annular surface which mates with one of said mass surfaces, said annular surfaces being formed such that transverse movement of said mass with respect to said member will cause said mating annular surfaces to produce said axial displacement.

16. The mechanism of claim 15, wherein said annular surfaces have spiral configurations, such that relative rotation between said mass and said members will produce said axial displacement.

17. The mechanism of claim 15, including a plurality of grooves formed in said mating annular surfaces, said grooves being generally oriented in a direction to intersect said axis, a ball positioned in each of said mating recesses such that the mating annular surfaces do not engage but instead are supported on said balls, the walls of said grooves being angled such that relative rotational movement between said mass and said members will produce said axial displacement at a lower acceleration than will relative transverse movement between said mass and said members.

18. A restraint system, comprising:
a housing;
a reel rotatably mounted in said housing;
a flexible element wound on said reel to be extended to restrain a load;
a spring urging the reel to rotate in a direction to wind said element on the reel;
a drive member rotatable with said reel;
a driven member rotated by said drive member while being movable toward and away from said drive member;
an inertia mass positioned between said members; and
a mechanism for supporting said mass in any orientation of said housing in a manner to permit substantially free movement of said mass transversely or rotationally relative to said members, in response to inertia forces, said mechanism including means for biasing said members toward each other and including means for translating said relative movement into relative displacement of said members away from each other in opposition to said biasing means;
said mechanism includes interengaging elements on said mass and said members that support said mass in a manner to rotate said mass with said members at low acceleration while permitting said mass to move on said interengaging elements in response to inertia forces at increased acceleration.

19. The system of claim 18, including latch means for preventing rotation of said reel which is movable in response to displacement of said driven member by said inertia to latch said reel.

20. The system of claim 19, wherein said latch means includes:
ratchet teeth on said reel;
a latch dog movable into and out of engagement with said ratchet teeth to permit or restrain rotation of said reel; and
a sear for holding said latch dog out of engagement with said ratchet teeth, said sear being urged by said biasing means toward said driven member and being movable in response to displacement of said driven member away from said drive member so as to release said latch dog when said mass is subjected to predetermined inertia forces.

21. The system of claim 18, wherein said interengaging elements comprise a plurality of aligned recesses in said mass and in said members with balls captured within said recesses.

22. The system of claim 18, wherein said interengaging elements comprise a plurality of holes in said members and a plurality of posts embedded in said mass with the ends of the posts being aligned with said holes, said post ends and said holes being formed for slidable engagement with respect to each other.

23. The system of claim 20, wherein said post ends have a diameter larger than said holes and have a frusto-conical surface which partially fits within a respective hole to center the posts with the holes while engaging the edge of the hole to support the mass and yet permit sliding, transverse or rotational movement of the mass relative to said members.

24. The system of claim 18, wherein said mechanism includes a tube positioned in said mass with one end of the tube facing the drive member and the other end of the tube facing the driven member, the tube ends being formed to slidably engage mating surfaces on said members which cooperate to support the mass and cause it to rotate with said members at low acceleration, but permit said mass to move transversely or rotationally with respect to said members with the post ends slidably engaging the mating surfaces on said members.

25. The system of claim 24, wherein said tube ends include an annular tapered surface with a plurality of shallow grooves formed therein, and a ball positioned in each of said grooves engaging the groove walls and engaging the opposing surface on the adjacent one of said members, the walls of said grooves and the taper of said ends being formed such that the mass will be rotationally displaced with respect to said members at an acceleration lower than the acceleration at which the mass will be transversely displaced with respect to said members.

26. The system of claim 18, wherein said drive member forms a disc on the end of said reel, having a plurality of ratchet teeth in its periphery for preventing rotation of the reel 27. The system of claim 18, including anti-backlash means positioned between said drive member and said mass to prevent said mass from moving transversely or rotationally with respect to said drive member when said reel is being rotated in a strap winding direction.

28. The system of claim 27, wherein said anti-backlash means comprises a pair of pivotally mounted, diametrically spaced levers having a locking position wherein said levers drivingly engage said mass, an unlocked position wherein said levers do not interfere with movement of said mass, and a drag spring for controlling the position of said levers.

29. A restraint system, comprising:
a housing;
a reel rotatably mounted in said housing;
a flexible element wound on said reel to be extended to restrain a load;
a spring urging the reel to rotate in a direction to wind said element on the reel;
a drive member rotatable with said reel;
a driven member rotated by said drive member while being movable toward and away from said drive member;
an inertia mass positioned between said members; and
a mechanism for supporting said mass in any orientation of said housing in a manner to permit substantially free movement of said mass transversely or rotationally relative to said members, in response to inertia forces, said mechanism including means for biasing said members toward each other and including means for translating said relative movement into relative displacement of said members away from each other in opposition to said biasing means; and
anti-backlash means positioned between said drive member and said mass to prevent said mass from moving transversely or rotationally with respect to said drive member when said reel is being rotated in a strap winding direction, said anti-backlash means comprises a pair of pivotally mounted, diametrically spaced levers having a locking position wherein said levers drivingly engage said mass, an unlocked position wherein said levers do not interfere with movement of said mass and a drag spring for controlling the position of said levers, said drag spring comprises a strip of spring metal extending diametrically between said mass and said drive member with the ends of said drag spring frictionally engaging said housing, and with said drag spring having means for positioning said levers.

30. A restraint system, comprising:
a housing;
a reel rotatably mounted in said housing;
a flexible element wound on said reel to be extended to restrain a load;
a spring urging the reel to rotate in a direction to wind said element on the reel;
a drive member rotatable with said reel;
a driven member rotated by said drive member while being movable toward and away from said drive member;
an inertia mass positioned between said members; and
a mechanism for supporting said mass in any orientation of said housing in a manner to permit substantially free movement of said mass transversely or rotationally relative to said members, in response to inertia forces, said mechanism including means for biasing said members toward each other and including means for translating said relative movement into relative displacement of said members away from each other in opposition to said biasing means; and
a pair of spaced rods having their ends embedded in said drive member and extending outwardly therefrom towards said driven member, said driven member being slidably mounted on said rods so that the rods transmit torque from said drive member to said driven member while permitting the driven member to be axially displaced on said rods.

31. The system of claim 30, wherein said mass includes a pair of enlarged holes, and said rods extend through said holes without restricting movement of said mass in the operation of said mechanism.

32. The system of claim 30, including a pair of anti-backlash levers respectively pivoted on said rods, and a spring for pivoting said levers into a restraining position with said inertia mass when the reel is rotated in a strap winding direction and into a position wherein the levers do not engage said inertia mass when the reel is rotated in a strap unwinding direction.

33. A restraint system, comprising:
a rotatably mounted reel having an end disk with ratchet teeth formed thereon;
a driven member rotated by said disk, said member being moveable toward and away from said disk;
an inertia mass positioned between said disk and said member; and
a mechanism extending directly between said member and one side of said mass and between said disk and side of said mass for supporting said mass in a manner to permit substantially free movement of said mass transversely or rotationally relative to said members in response to inertia forces, said mechanism including means for translating said relative movement into displacement of said members away from said disk to trigger locking of said reel.

34. An inertia responsive system comprising:
a pair of spaced members mounted for relative movement towards and away from each other;
a plurality of recesses formed in each of said members with the recesses of each member facing the other member;
an inertia mass positioned between said members and having a plurality of recesses facing and aligned with the recesses of one of said members to form mating recesses and a plurality of recesses facing and aligned with the recesses of the other member to form mating recesses; and
a ball positioned in each of said mating recesses, wherein said mass is supported by said balls in cooperation with walls of said mating recesses, said mass being responsive to changes in acceleration wherein movement of said mass relative to said members will cause relative displacement of said members.

35. The system of claim 34, wherein said members have faces which are generally parallel to each other and said recesses in said members are in said faces, and said mass has a generally disk shape with the end faces of the disk being generally parallel to the adjacent face of the adjacent member.

36. The system of claim 34, wherein said mass and said members have a central opening, and including:
- a hub extending through the opening in said mass and the opening in said members;
- a calibration screw extending through said hub and adapted to mount said hub on supporting structure;
- a calibration spring urging said hub toward said structure;
- a retainer on said hub extending adjacent to one of said members whereby movement of said one member will react against said retainer and cause movement of said hub away from said structure against the urging of said spring; and
- a part on said hub for initiating another action in response to said hub movement.

37. The system of claim 34, comprising:
- a restraining element mounted to be extended to restrain a load; and
- means to prevent extension of said element in response to said displacement.

38. The system of claim 34, comprising:
- a housing;
- a reel rotatably mounted in said housing;
- a flexible element wound on said reel to be extended to restrain a load;
- a spring urging the reel to rotate in a direction to wind said element on the reel; and
- said member being mounted on said housing and connected to prevent unwinding of said reel in response to said displacement.

39. A method of preventing rotation of a reel in a restraint system in response to movement of an inertia mass, comprising:
- supporting an inertia mass between a pair of members on structure extending between one of said members and one side of said mass and structure extending between the other member and an opposite side of said mass, said members being moveable relative to each other toward and away from each other;
- said supporting step including supporting the mass in a manner to permit the mass to move rotationally or transversely relative to said members;
- biasing said members toward each other;
- said supporting step further including supporting the mass in a manner to cause it to be rotated by said members at a low acceleration while permitting said mass to move rotationally or transversely relative to said members and produce displacement of said driven member against the biasing force; and
- utilizing said displacement to latch said reel.

40. A method of preventing rotation of a reel in a restraint system in response to movement of an inertia mass, comprising:
- supporting an inertia mass between a pair of members which are movable relative to each other toward and away from each other;
- said supporting step including supporting the mass in a manner to permit the mass to move rotationally or transversely relative to said members;
- biasing said members toward each other;
- said supporting step further including supporting the mass in a manner to cause it to be rotated by said members at the low acceleration while permitting said mass to move rotationally or transversely relative to said members and produce displacement of said driven member against the biasing force; and
- utilizing said displacement to latch said reel;
- said supporting step further including supporting said mass on elements extending between said mass, including the conical tips of the ends of a post carried by said mass partially extending into and engaging the ends of holes formed in said members.

* * * * *